United States Patent
Swami et al.

(10) Patent No.: US 8,213,511 B2
(45) Date of Patent: Jul. 3, 2012

(54) VIDEO ENCODER SOFTWARE ARCHITECTURE FOR VLIW CORES INCORPORATING INTER PREDICTION AND INTRA PREDICTION

(75) Inventors: Pramod Kumar Swami, Karnataka (IN); Venugopala Krishna Madumbu, Bangalore (IN); Anurag Mithalal Jain, Bangalore (IN); Jacques Michel Bride, Antibes (FR); David Gottardo, Juans-les-pins (FR)

(73) Assignee: Texas Instruments Incorporated, Dallas, TX (US)

( * ) Notice: Subject to any disclaimer, the term of this patent is extended or adjusted under 35 U.S.C. 154(b) by 1100 days.

(21) Appl. No.: 12/111,605

(22) Filed: Apr. 29, 2008

(65) Prior Publication Data

US 2008/0267293 A1    Oct. 30, 2008

Related U.S. Application Data (60) Provisional application No. 60/914,890, filed on Apr. 30, 2007.

(51) Int. Cl.
  *H04N 7/32* (2006.01)
(52) U.S. Cl. ............................................... 375/240.16
(58) Field of Classification Search .......... 375/130–153, 375/240.01–240.29; 704/500–504; H04B 1/66; H04N 7/12, 11/02, 11/04, 7/24, 7/26, 7/32
See application file for complete search history.

(56) References Cited

U.S. PATENT DOCUMENTS

| | | | |
|---|---|---|---|
| 5,157,742 A * | 10/1992 | Niihara | 382/236 |
| 2003/0128885 A1* | 7/2003 | Zhou | 382/245 |
| 2004/0218673 A1* | 11/2004 | Wang et al. | 375/240.12 |
| 2005/0013368 A1* | 1/2005 | Gallant et al. | 375/240.16 |
| 2005/0117653 A1* | 6/2005 | Sankaran | 375/240.24 |
| 2006/0018385 A1* | 1/2006 | Lee | 375/240.24 |
| 2006/0256854 A1* | 11/2006 | Jiang | 375/240.03 |

\* cited by examiner

*Primary Examiner* — Gims Philippe
*Assistant Examiner* — Brent R Lindon
(74) *Attorney, Agent, or Firm* — Robert D. Marshall, Jr.; Wade James Brady, III; Frederick J. Telecky, Jr.

(57) ABSTRACT

This invention is a method of video encoding. The number N macroblocks stored in a temporary buffer depends upon an estimated number of motion vectors. N macroblocks of current and prior frame data is transferred to the temporary buffer. The invention determines for each macroblock whether to be inter frame predicted or intra frame predicted. The inter and intra macroblocks are separately encoded based upon this determination and stored in an output buffer. Output macroblocks are output from the output buffer in raster scan order. This technique permits the process to loop over differing number of macroblocks in differing parts of the encoding process. Entropy encoding complexity from separating inter and intra macroblock encoding is avoided by separating a symbol generation phase from an encoding phase.

15 Claims, 6 Drawing Sheets

FIG. 1
(PRIOR ART)

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

VIDEO ENCODER SOFTWARE
ARCHITECTURE FOR VLIW CORES
INCORPORATING INTER PREDICTION AND
INTRA PREDICTION

CLAIM OF PRIORITY

This application claims priority under 35 U.S.C. 119(e)(1) to U.S. Provisional Application No. 60/914,890 filed Apr. 30, 2007.

TECHNICAL FIELD OF THE INVENTION

The technical field of this invention is video encoding especially in a very long instruction (VLIW) processor.

BACKGROUND OF THE INVENTION

Video encoders are becoming more complex over time. Video compression standards promise increased compression ratios and better visual quality. Encoder implementation varies across different data processor architectures. Conventional encoder implementation suffers from increased system overhead and severe overall performance degradation.

Conventional encoder designs include encoding loops revolving around single macroblocks. These encoders typically trigger a loop filtering process for all macroblocks at the end of encoding for each frame. The reconstructed pixels of each macroblock prior to loop filtering are used to predict subsequent macroblocks in an intra prediction mode. This intra prediction mode dependency makes it difficult to process multiple macroblocks at a time. Thus the conventional implementation incurs penalties from cache misses and produces many small and scattered data transfers.

SUMMARY OF THE INVENTION

This invention is an alternate to the conventional macroblock based encoding approach designed to exploit multi-level cache based architectures such as implemented in the Texas Instruments TMS320C6400 family of digital signal processors. The encoder design can be extended to all video encoders with minor modification to give optimal performance with minimum system overhead. This invention removes some inherent but non-trivial coding dependencies. This invention results in increased parallelism in different processing blocks of the encoder.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
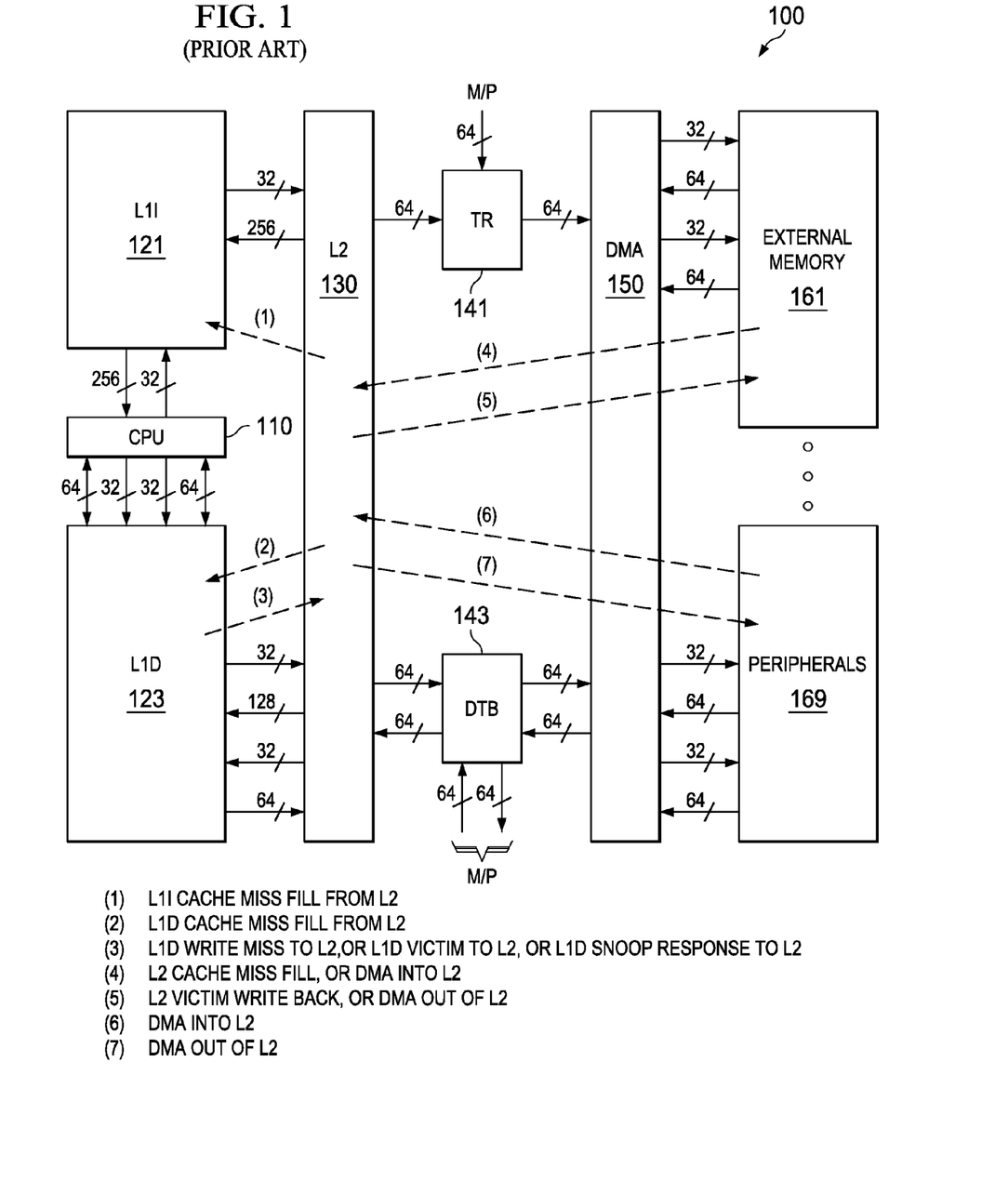
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
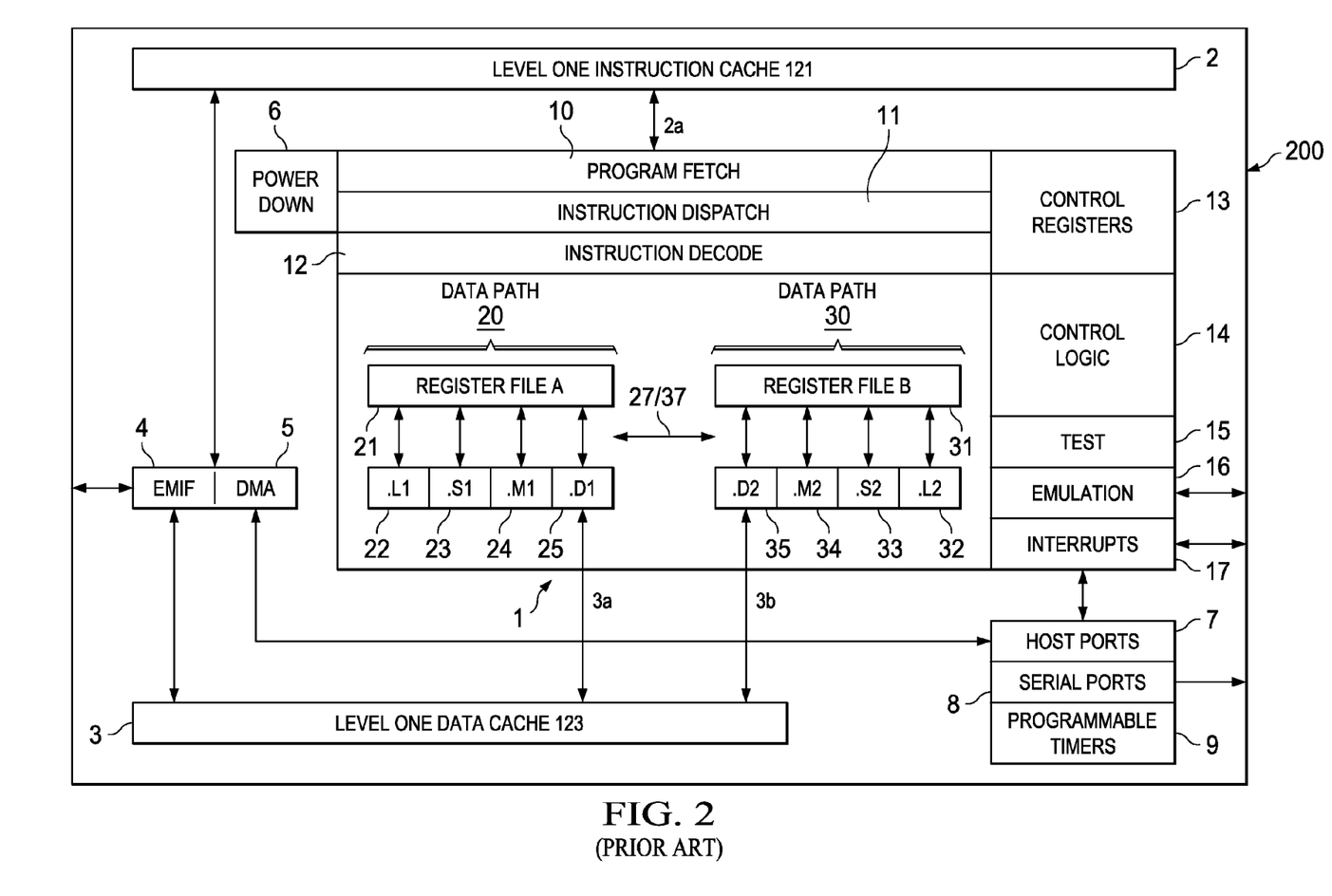
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level 1 instruction cache 121 (also referenced as memory 2) included in digital signal processor integrated circuit 200. Digital signal processor integrated circuit 200 also includes level one data cache 123 (also referenced as memory 3). Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
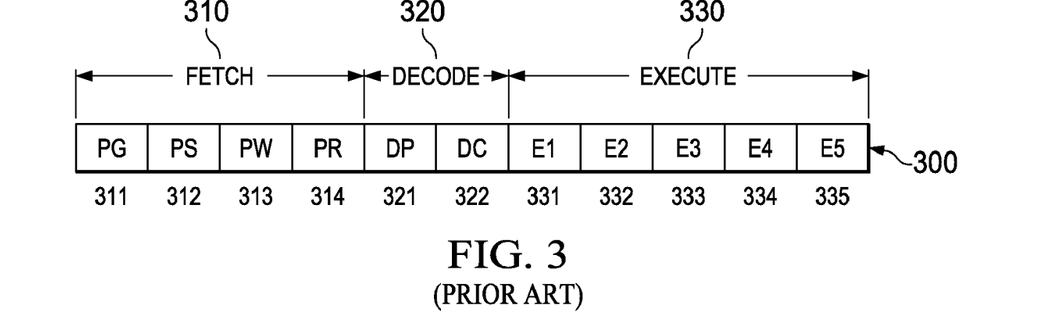
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extensions instructions, the results are written to a register file. Multiply extension instructions complete during the E4 phase 334.

During E5 phase 335, load instructions write data into a register. Load instructions complete during the E5 phase 335.

Figure 4:
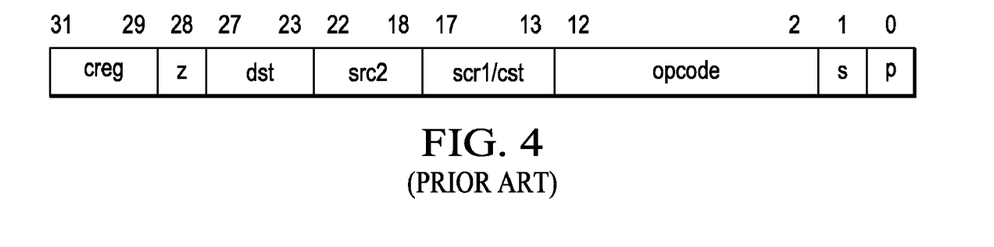
FIG. 4 illustrates the instruction syntax of the very long instruction word digital signal processor core illustrated in FIG. 2 (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |

TABLE 1-continued

| Conditional | creg | | | z |
|---|---|---|---|---|
| Register | 31 | 30 | 29 | 28 |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Figure 5:
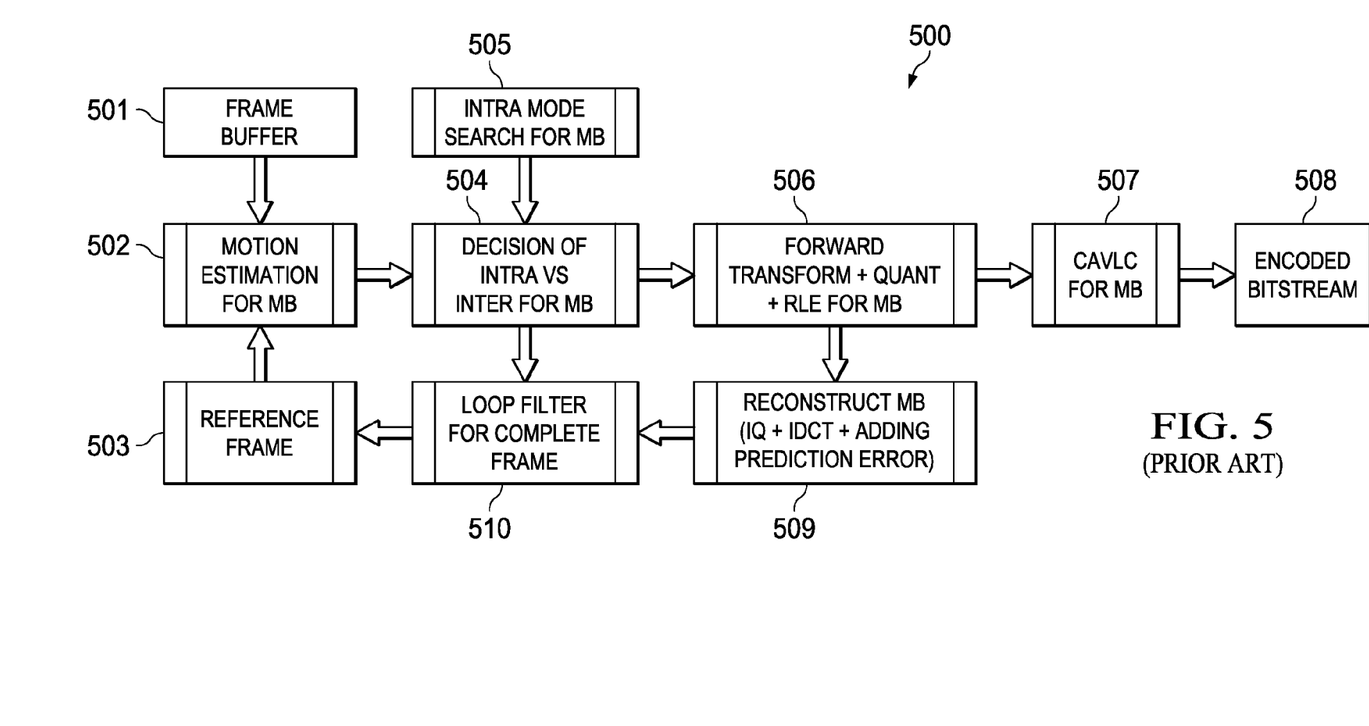
FIG. 5 illustrates an overview of the video encoding process of the prior art.

FIG. 5 illustrates the encoding process 500 of video encoding according to the prior art. Many video encoding standards such as H.264 standard use similar processes such as represented in FIG. 5. The incoming data to be encoded is loaded into frame buffer 501.

Video encoding standards typically permit two types of predictions. The first type of prediction is inter-frame prediction. In inter-frame prediction, data is compared with data from the corresponding location of another frame. In intra-frame prediction, data is compared with data from another location in the same frame.

For inter prediction, data reference frame buffer 503 and data from frame buffer 501 supply motion estimation block 502. Motion estimation block 502 determines the positions and motion vectors of moving objects within the picture. It is conventional to calculate motion estimation based on macroblocks within the incoming frame. This motion data is supplied to decision block 504. Decision block also receives prediction data from intra mode search block 505.

The second type of prediction is intra prediction. Intra prediction predicts a macroblock of the current frame using pixels of that frame which are already encoded and reconstructed by the encoder. Intra mode search block 505 forms prediction blocks of different kinds using pixels of the top and left of the current macroblock and searches for the predictor with the best match of the current macroblock. Intra mode search block 505 supplies this prediction data to decision block 504. Decision block 504 determines whether coding with inter mode prediction according to motion estimation data from motion estimation block 502 is more advantageous than coding with intra mode prediction according to prediction data from intra mode search block 505. It is typical to make this prediction mode decision for each macroblock of the frame.

The selected prediction type data is supplied by decision block 504 to encoding block 506. This encoding typically includes frequency transformation, quantization and run length encoding (RLE). Frequency transformation transforms the macroblock the pixel data into the spatial frequency domain. This typically involves a discrete cosine transform (DCT). This frequency domain data is then generally quantized. This quantization typically takes into account the range of data values for the current macroblock. Thus differing macroblocks may have differing quantizations. Run length encoding involves recognizing runs of equal data blocks. These runs of equal data blocks are transformed into a base data block, a repeat indicator and an indication of the number of repeats. Repeated data blocks are run length encoded when the run length encoded form requires fewer bits than the native form. In the H.264 standard, the macroblock data may be arbitrarily reordered. This reordering is reversed upon decoding. Other video encoding standards and the H.264 main profile transmit data for the macroblocks in strict raster scan order.

The encoded data from encoding block 506 is entropy coded in entropy encoding block 507. Entropy encoding employs fewer bits to encode more frequently used symbols and more bits to encode less frequency used symbols. This process reduces the amount of encoded that must be transmitted and/or stored. Examples of entropy encoding include context adaptive variable length coding (CAVLC) or context adaptive binary arithmetic coding (CABAC). The resulting entropy encoded data is the encoded data stream 508.

It is typical for encoding block 506 to encode differential data between the current frame and the prior frame rather than the original frame data. Assuming there is relatively little change from frame to frame, this differential data has a smaller magnitude than the raw frame data. Thus this can be expressed in fewer bits contributing to data compression. This is true even if motion estimation block 502 finds no moving objects to code. If the current frame and the prior frame are identical, a subtraction unit within encoding block 506 will produce a string of zeros for data. This data string can be encoded using few bits.

Video encoders typically periodically transmit unpredicted frames. In such an event all the prediction happens from the reconstructed samples of the current frame data. In a video movie a scene change may produce such a large change between adjacent frames that differential coding provides little advantage. Video coding standards typically signal whether a frame is a predicted frame and the type of prediction in the transmitted data stream.

Encoding process 500 includes reconstruction of the frame based upon recovered data. Reconstruction block 509 receives encoded data from encoding block 506. Reconstruction block 509 then applies reverse run length encoding, reverse quantization and frequency domain to spatial domain conversion. The frequency domain to spatial domain conversion typically employs an inverse discrete cosine transform (IDCT).

Loop filter 510 receives the reconstructed frame from reconstruction block 509 and the selected prediction parameters from decision block 504. Loop filter 510 filters the reconstructed block according to the prediction parameters and attempts to remove block artifacts introduced by the encoding/decoding process. The result is a frame of data reconstructed from the encoded data from frame buffer 501. This reconstructed/filtered frame data is stored in reference frame buffer 503. This frame data in reference frame buffer 503 is used by motion estimation block 502 during encoding of the next frame.

This invention overcomes several issues in conventional encoders by simultaneously operating on multiple macroblocks. This invention will be described in conjunction with the H.264 video conferencing standard. The H.264 standard includes several dependencies across two consecutive macroblocks. It is therefore not easy to modify conventional H.264 encoding to operate on multiple macroblocks at a time. Intra prediction coded frames offers little room to overcome these dependencies. This invention exploits the fact that inter prediction coded macroblocks have smaller dependency on the previously coded macroblocks of the same frame than intra coded macroblocks. This invention also exploits the fact that reconstruction process of inter prediction coded macroblocks can be carried out independently and in parallel with the intra prediction coded macroblocks without breaking the sequential nature of final bitstream encoding. This invention minimizes data transfer overheads by grouping the transfers across different macroblocks into a single large transfer. This becomes even more efficient because this invention groups all inter prediction coded macroblocks at the end of motion estimation stage and before the rest of the encoding loops for variable number of macroblocks.

Figure 6:
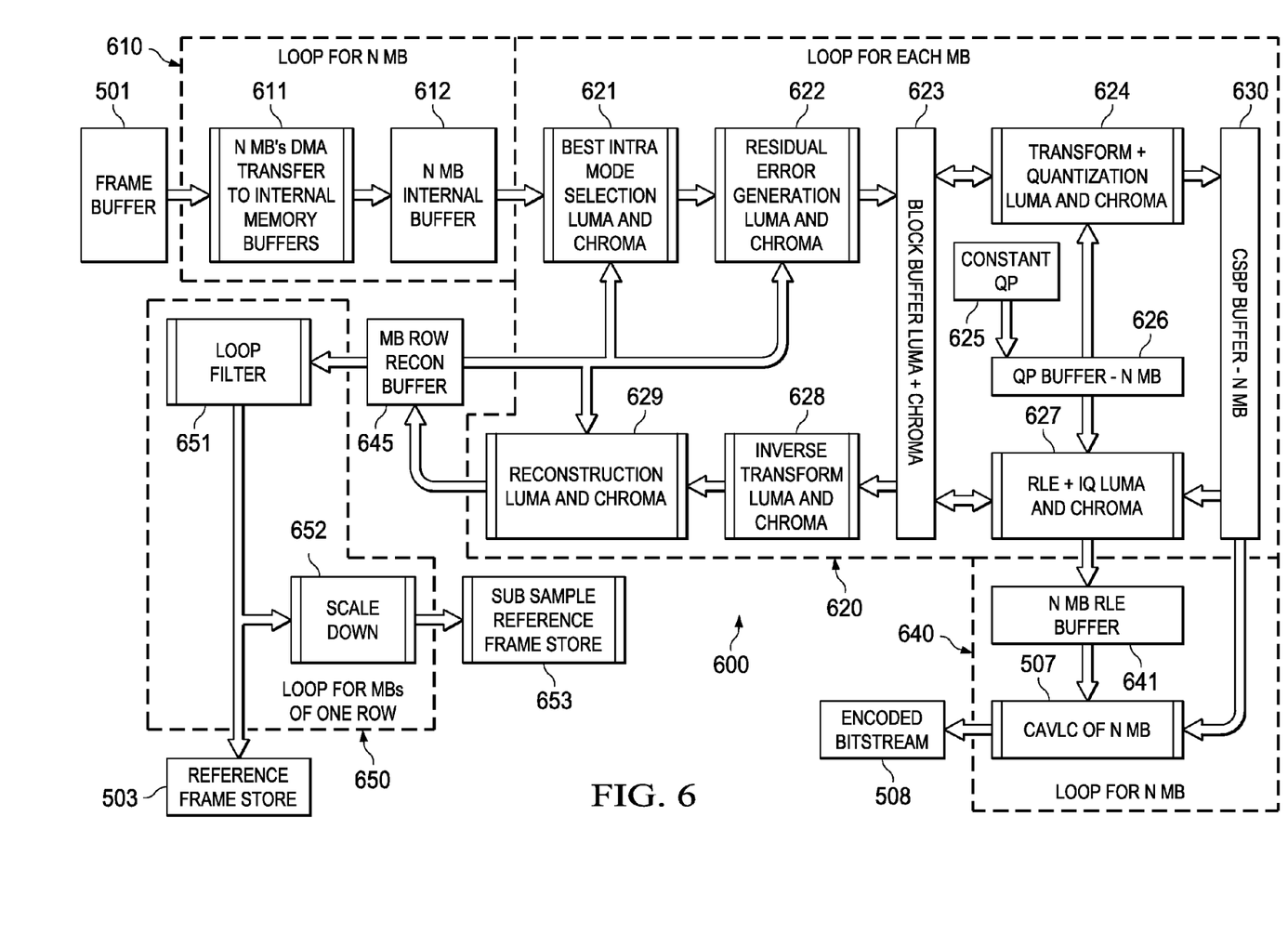
FIG. 6 illustrates an overview one aspect of the video encoding process of this invention applied to macroblocks in intra mode frames.
Figure 7:
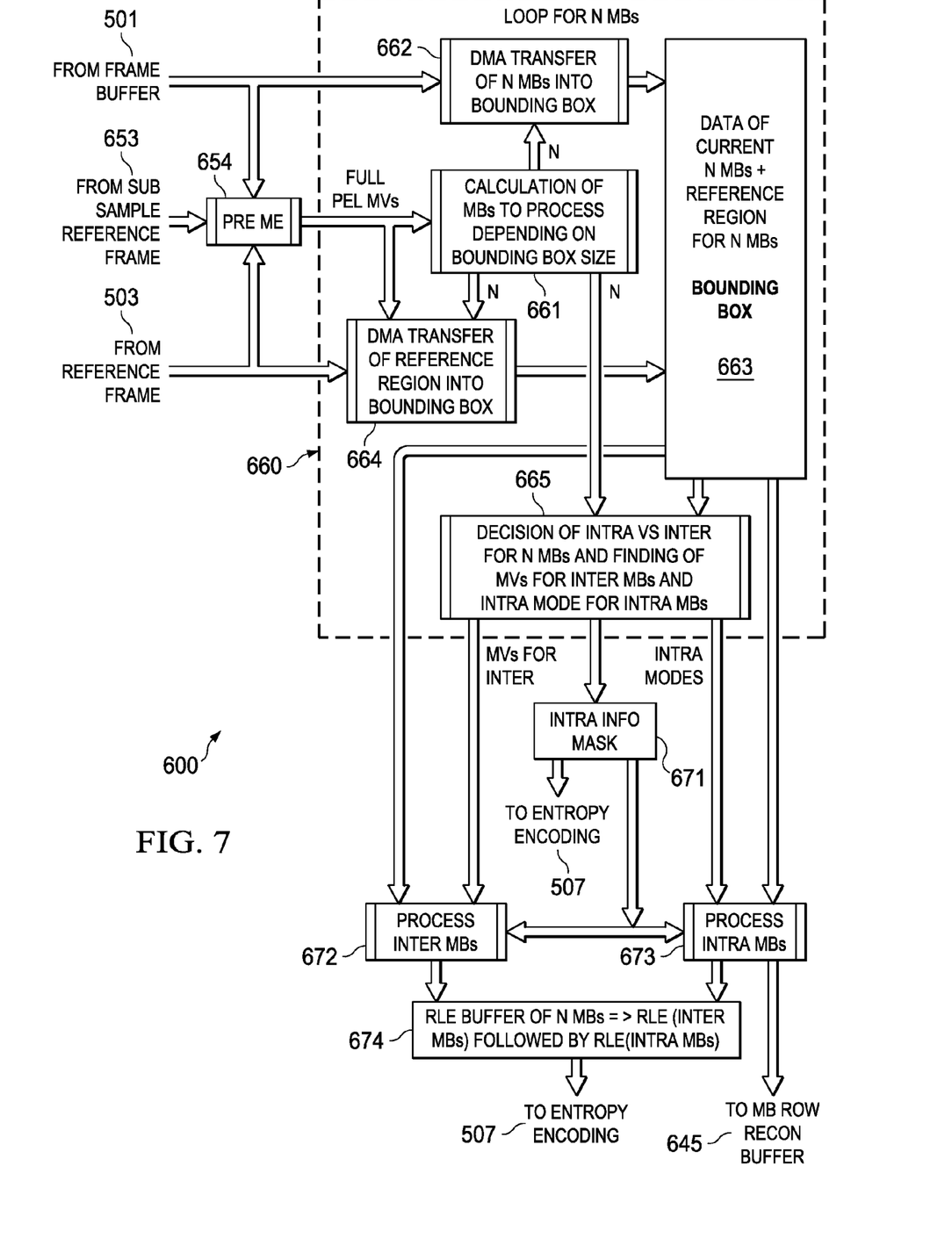
FIG. 7 illustrates an overview of a second aspect of the video encoding of this invention applied to macroblocks in predicted frames.

FIGS. 6 and 7 illustrate the encoding process 600 of video encoding according to an example of this invention. FIG. 6 shows the coding flow for intra prediction frames. FIG. 7 shows the coding flow 600 for inter prediction P frames. Those skilled in the art would easily realize how to extend this process to encoding B frames.

FIG. 6 shows the coding flow 600 for intra prediction frames. Incoming data process 610 including frame buffer 510, direct memory access (DMA) process 611 and macroblock internal buffer 612 loops for each N macroblocks. The incoming data to be encoded is loaded into frame buffer 501. Based upon a number of macroblocks determination which will be further described below, direct memory access (DMA) process 611 transfers a number N macroblocks from frame buffer 501 to macroblock internal buffer 612.

Best Intra mode selection block 621 employs the samples of current macro block from macroblock internal buffer 612 and the reconstructed samples of neighboring macroblocks above and to the left from reconstruction block 629. Best Intra mode selection block 621 calculates the sum of absolute differences (SAD) for all supported intra_16×16 luma and chroma prediction modes. Best Intra mode selection block 621 identifies the best luma and chroma prediction mode on the basis of minimum SAD. The best mode among all the intra modes is stored.

Residual error generation block 622 employs the samples of current macroblocks stored in macroblock buffer 612, the reference macroblock from reconstruction block 629 and the best prediction mode determined by best Intra mode selection block 621. Residual error generator block 622 generates error data and writes this error data into block buffer 623. Block buffer 623 stores this error data for the transform and quantization blocks.

Transform and quantization block 624 operates separately on the luma data and chroma data. Transform and quantization block 624 receives luma error data stored in block buffer 623. Transform and quantization block 624 performs spatial domain to frequency domain transform and quantization on the luma error block and writes back to the same memory area in block buffer 623. It also performs the DC transform. Transform and quantization block 624 receives chroma error data stored in block buffer 623. Transform and quantization block 624 performs frequency domain transform and quantization on the chroma error block and writes back to the same memory area in block buffer 623. It also performs the DC transform. The quantization parameters used are stored in constant QP block 625 and QP buffer 626, which buffers the quantization parameters for the current macroblocks. Transform and quantization block 624 also produces coded sub-block pattern (CSBP) data which is stored in CSBP buffer 630. In the preferred embodiment this CSBP data is a 32 bit entity which identifies zero coded macroblocks.

Run length encoding (RLE) and inverse quantization (IQ) block 627 operates separately on luma and chroma data. Run length encoding (RLE) and inverse quantization (IQ) block 627 receives transformed and quantized luma error data from transform and quantization block 624 via buffer 623, CSBP information from CSBP buffer 630 and de-quantization information from QP buffer 626. Run length encoding (RLE) and inverse quantization (IQ) block 627 performs run length encoding (RLE) on the luma data and stores the RLE information in RLE buffer 641. RLE buffer 641 can accommodate RLE information for N macro blocks. Run length encoding (RLE) and inverse quantization (IQ) block 627 also performs inverse DC transform and inverse quantization and stores this data back into same memory area of block buffer 623. Run length encoding (RLE) and inverse quantization (IQ) block 627 receives transformed and quantized chroma error data from transform and quantization block 624 via buffer 623, CSBP information from CSBP buffer 630 and de-quantization information from QP buffer 626. Run length encoding (RLE) and inverse quantization (IQ) block 627 performs run length encoding (RLE) on the chroma data and stores the RLE information in RLE buffer 641. RLE buffer 641 can accommodate RLE information for N macro blocks. Run length encoding (RLE) and inverse quantization (IQ) block 627 also performs inverse DC transform and inverse quantization and stores this data back into same memory area of block buffer 623.

The reason for keeping the transformation and RLE modules separate for luma and chroma is the role of DC transform. DC transform is always a part of chroma processing whether these are intra or inter predicted. For luma processing the DC transform is used in only intra predicted macro blocks, hence separate modules are kept.

The RLE buffer 641 supplies the input for entropy encoding block 507. As previously described this variable length encoding could include context adaptive variable length coding (CAVLC) or context adaptive binary arithmetic coding (CABAC). This coding process is aided by CSBP data from CSBP buffer 630 indicating all zero macroblocks. This process 640 loops on the N macroblocks, which is possible because RLE buffer 641 stores RLE data for N macroblocks. Entropy encoding block 507 generates an encoded bit stream 508 of N macroblocks.

Inverse transform block 628 recalls inverse quantized error data from block buffer 623 and number of blocks on inverse transform has to be performed. Inverse transform block 628 performs an inverse transform on this data obtaining a spatial domain inverse quantized residue error for supply to reconstruction block 629.

Reconstruction block 629 accepts spatial domain inverse quantized residue error data from inverse transform block 628, reference data and a prediction mode input from best Intra mode selection block 621. Reconstruction block 629 reconstructs the frame data for the supplied macroblocks. This frame data for all the reconstructed macroblocks of a row is stored in macroblock row reconstruction buffer 645. Loop 620 consisting of best Intra mode selection block 621, residual error generation block 622, block buffer 623, transform and quantization block 624, QP block 625, QP buffer 626, run length encoding (RLE) and inverse quantization (IQ) block 627, inverse transform block 628 and reconstruction block 629 loops for each macroblock.

Loop filter 651 performs a loop filtering operation on the macro blocks of the row stored in macroblock row reconstruction buffer 645. This filtering requires the top 4 row samples and samples of current macroblock row. Loop filter 651 filters out the top 4 rows and 12 rows of current macroblock row. The last 4 rows of the current macroblock row are filtered during filtering of the next macroblock row. Loop filter 651 stores these filtered rows in reference frame buffer 503.

Scale down block 652 scales down the reconstructed, filtered samples to be used in pre-motion estimation block 654 (FIG. 7) during encoding of an upcoming P frame. Scale down block 652 down samples the pixels in both horizontal and vertical direction by one quarter. The scaled down frame is stored in sub sample reference frame buffer 653. Loop 650 consisting of loop filter 651 and scale down block 652 operates for the macroblocks of a raster scan row.

FIG. 7 shows the coding flow 600 for inter prediction P frames. Pre-motion estimation (ME) block 654 receives data from sub sample reference frame buffer 653 (FIG. 6), the current frame from frame buffer 501 and reference frame data from reference frame buffer 503 (FIG. 6). Pre-motion estimation block 654 calculates the best full pel motion vectors for each macro block along with the corresponding SAD. The motion estimation technique uses could be any generic motion estimation scheme. The preferred embodiment uses a predictor based 3-step decimated hierarchical and telescopic search scheme.

Determination block 661 determines the number of macroblocks N to be processed simultaneously. In P frame encoding determination block 661 selects the number of macroblocks to be processed together based upon the motion vectors of consecutive macroblocks. These motion vectors are received form pre-motion estimation block 654. The encoder sets aside some internal memory storage space (in the preferred embodiment 10 KBytes) in bounding box memory space 663 to store the reference region. This data is later used for generating prediction error for consecutive macroblocks. The number of macroblocks which can be stored in bounding box memory space 663 depends upon the motion vectors of these macroblocks. In this invention determination block 661 takes the full pel motion vectors from pre-motion estimation block 654 and determines the number of macroblocks N to be processed together. This number of macroblocks N controls the memory transfer operation of DMA process 662, which moves N macroblocks from frame buffer 501 to bounding box space 663. This number of macroblocks N also controls the memory transfer operation of DMA process 664, which moves N macroblocks from reference frame buffer 503 to bounding box space 663.

Decision block 665 determines the best prediction mode for each macroblock in the group of N macroblocks. Decision block 665 produces this information in the form of an intra_info_mask. Intra_info mask is a 32-bit data word in which the bit state indicates intra prediction or inter prediction for the corresponding macroblock. This intra_info_mask is stored in intra_info_mask buffer 671. Decision block 665 also transmits motion vectors for inter predicted macroblocks to inter macroblock process 672 and prediction modes for intra predicted macroblocks to intra macroblock process 673. Decision block 665 makes these decisions at the end of a pre-motion estimation stage of the encoder for each set of macroblocks. Decision block 665 enables a deterministic structure with an accurate count of intra predicted and inter predicted macroblocks. This information is required for the rest of the encoding process. Process 660 including determination block 661, DMA process 662, bounding box memory space 663, DMA process 664 and decision block 665 loops for each N macroblocks.

Inter macroblock process 672 provides additional data processing up to the reconstruction stage for those macroblocks that are to be inter prediction encoded. Inter macroblock process 672 includes motion vector calculation, forward transformation, quantization, inverse quantization and run-length encoding modules. Inter macroblock process 672 employs macroblock data stored in bounding box space 663 and stores the processed data in RLE buffer 674. In inter macroblock process 672 these stages all operate on a set of macroblocks at a time. Inter macroblock process 672 supplies processed macroblock data to macroblock row reconstruction buffer 645 for reconstruction. This process including macroblock row reconstruction buffer 645, loop filter 651, scale down block 652, sub sample reference frame buffer 653 and reference frame buffer 503 operates as described in FIG. 6.

Intra macroblocks process 673 operates the same way as the I frame flow described in conjunction with FIG. 6. Intra macroblock process 673 employs macroblock data stored in bounding box space 663 and intra_info_mask indications from decision block 665 stored in intra_info_mask buffer 671. Intra macroblock process 673 stores the processed data in RLE buffer 674. Intra macroblock process 673 supplies processed macroblock data to macroblock row reconstruction buffer 645 for reconstruction. This process including macroblock row reconstruction buffer 645, loop filter 651, scale down block 652, sub sample reference frame buffer 653 and reference frame buffer 503 operates as describe in FIG. 6.

In the preferred embodiment, the inter prediction macroblocks are all encoded first in inter macroblock process 672. Then the intra prediction macroblocks are encoded in intra macroblock process 673. The inter and intra prediction encoding are not mixed but are carried out separately as determined by the intra_info_mask indications stored in intra_info_mask buffer 671.

Entropy encoding block 507 (FIG. 6) provides final entropy encoding for both intra and inter prediction macroblocks. As described above, different macroblock processing loops write the processed macroblock data generated into common RLE buffer 674. Entropy encoding block 507 later recalls this data from RLE buffer 674 in raster scan order. Entropy encoding block 507 provides entropy encoding such as CAVLC or CABAC. The information about whether inter or intra prediction was chosen for macroblock processing is provided by intra_info_mask buffer 671. Entropy encoding block 507 also uses CSBP data from CSBP buffer 620, which indicates all zero coded macroblocks (FIG. 6). The resulting entropy encoded data is the encoded data stream 508.

During entropy encoding, the required information for calculation of boundary strength is available. Some of this information including the coded-block-pattern, the macroblock type and the motion vector information is also encoded in the bit stream. Reloading of this information is thus saved by calculating boundary strength during the entropy coding stage. The advantage of pre-computing boundary strength prior to the actual filtering process avoids unnecessary computation, which otherwise would be required to filter the edges with boundary strength equal to zero.

A number of further optimizations are possible in this invention. Blocks from different macroblocks are classified based on their prediction types. These are later processed in a single function call. This achieves an optimum software-pipelined code for multiple blocks and results in reduced overhead of multiple function calls and epilogue-prologue. This uses packed instructions on SIMD architecture such as provided by the Texas Instruments TMS320C6400 family of digital signal processors illustrated in FIGS. 1 to 4. This results in increased depth in software pipeline along with increased number of parallel instructions in execute packets, which takes maximum advantage of VLIW SIMD architecture illustrated in FIGS. 1 to 4.

An innovative bounding box calculation could bring in reference data for prediction error generation. This could be optimized along with the search algorithm whereby the interpolation for searching and prediction error generation for the best match is unified.

The invention may include calculating boundary strengths in multiple stages in a light-updation mode. This would eliminate the need of a separate loop and reloading of the datastructures which would consume considerable number of cycles.

What is claimed is:

1. A method of video encoding comprising the steps of:
    estimating motion vectors between consecutive frames in a video;
    determining a number of macroblocks N which can be stored in a temporary buffer dependent upon said estimated motion vectors;
    transferring N macroblocks from a frame buffer storing a latest video frame to said temporary buffer;
    transferring N macroblocks from a reference buffer storing a prior video frame corresponding to said N macroblocks from said frame buffer in said temporary buffer;
    determining for each macroblock of the N macroblocks in the latest video frame stored in said temporary buffer whether to be inter frame predicted or intra frame predicted;
    inter frame prediction encoding all macroblocks determined to be inter frame predicted of said N macroblocks stored in said temporary buffer sequentially and storing said inter frame prediction encoded macroblocks in an output buffer;
    intra frame prediction encoding all macroblocks determined to be intra frame predicted of said N macroblocks stored in said temporary buffer sequentially and separately from encoding said inter frame prediction encoded macroblocks, and storing said intra frame prediction encoded macroblocks in said output buffer; and
    outputting said inter and intra frame prediction encoded macroblocks from said output buffer in raster scan order.

2. The method of claim 1, wherein:
said step of inter prediction encoding includes
    recalling a macroblock of the latest video frame from said temporary buffer, and
    recalling at least one macroblock of the prior video frame from said temporary buffer, said at least one macroblock of the prior video frame dependent upon motion vectors of said macroblock of the latest video frame.

3. The method of claim 1, wherein:
said step of inter prediction encoding includes transformation of each output macroblock from spatial domain into frequency domain.

4. The method of claim 1, wherein:
said step of inter prediction encoding includes quantization of each output macroblock.

5. The method of claim 1, wherein:
said step of inter prediction encoding includes run length encoding each output macroblock.

6. The method of claim 1, wherein:
said step of intra prediction encoding includes
    recalling a macroblock of the latest video frame from said temporary buffer, and
    recalling at least one additional macroblock of the latest video frame from said temporary buffer, said at least one additional macroblock dependent upon an intra mode.

7. The method of claim 1, wherein:
said step of intra prediction encoding includes transformation of each output macroblock from spatial domain into frequency domain.

8. The method of claim 1, wherein:
said step of intra prediction encoding includes quantization of each output macroblock.

9. The method of claim 1, wherein:
said step of intra prediction encoding includes run length encoding each output macroblock.

10. The method of claim 1, wherein:
said step of outputting said inter and intra frame prediction encoded macroblocks includes entropy encoding each output macroblock.

11. The method of claim 10, wherein:
said step of entropy encoding includes symbol generation, and final bit insertion; and
whereby dependency within entropy coding required for inserting bits in the sequential order in which macroblocks are encoded is removed.

12. The method of claim 1, wherein:
said steps of inter frame prediction encoding macroblocks and intra frame prediction encoding macroblocks are sequential whereby all macroblocks within the N macroblocks determined to be inter frame prediction encoded are encoded and thereafter all macroblocks within the N macroblocks determined to be intra frame prediction encoded are encoded.

13. The method of claim 1, wherein:
said step of inter frame prediction encoding includes a separate motion estimation stage which operates on a variable number of macroblocks simultaneously depending on a motion estimation scheme and internal memory requirements.

14. The method of claim 1, further including the steps of:
classifying blocks across different macroblocks based on their prediction types; and
later processing plural macroblocks in a single function call.

15. The method of claim 1, further including the steps of:
calculating boundary strengths in multiple stages in a light-updation mode.

* * * * *